United States Patent
Gnausch et al.

(10) Patent No.: US 9,518,865 B2
(45) Date of Patent: Dec. 13, 2016

(54) DEVICE FOR MEASURING A POWER DENSITY DISTRIBUTION OF A RADIATION SOURCE

(71) Applicant: JENOPTIK Optical Systems GmbH, Jena (DE)

(72) Inventors: Tobias Gnausch, Jena (DE); Meik Panitz, Weimar (DE); Ralf Mueller, Henneberg (DE); Marc Himel, Winter Springs, FL (US)

(73) Assignee: Jenoptik Optical Systems GmbH, Jena (DE)

( * ) Notice: Subject to any disclaimer, the term of this patent is extended or adjusted under 35 U.S.C. 154(b) by 0 days.

(21) Appl. No.: 14/471,314

(22) Filed: Aug. 28, 2014

(65) Prior Publication Data

US 2015/0060683 A1    Mar. 5, 2015

(30) Foreign Application Priority Data

Aug. 28, 2013  (DE) .................. 10 2013 014 506
Aug. 14, 2014  (DE) .................. 10 2014 011 954

(51) Int. Cl.
*G01N 21/33* (2006.01)
*G01J 1/42* (2006.01)
*G01J 1/04* (2006.01)

(52) U.S. Cl.
CPC ............ *G01J 1/4257* (2013.01); *G01J 1/0407* (2013.01); *G01J 1/429* (2013.01)

(58) Field of Classification Search
CPC .................................. G01J 1/429; G01N 21/33
See application file for complete search history.

(56) References Cited

U.S. PATENT DOCUMENTS

| | | | | |
|---|---|---|---|---|
| 4,947,047 A | * | 8/1990 | Muraki | G02F 1/113 250/205 |
| 5,596,413 A | * | 1/1997 | Stanton | G03F 9/70 250/548 |
| 6,072,631 A | * | 6/2000 | Guenther | G02B 5/32 359/565 |
| 6,183,918 B1 | * | 2/2001 | Nishiki | G02B 6/02138 359/569 |
| 7,420,146 B1 | * | 9/2008 | Spawr | G01J 1/04 250/205 |

(Continued)

FOREIGN PATENT DOCUMENTS

DE    10 2007 062 825 A1    7/2009

*Primary Examiner* — Christine Sung
(74) *Attorney, Agent, or Firm* — Muncy, Geissler, Olds & Lowe, P.C.

(57) ABSTRACT

A device and method for measuring a power density distribution of a radiation source is provided. The device includes a radiation source designed to emit a light beam in a radiation direction; a substrate disposed downstream of the radiation source in the radiation direction and having an extent in an x-direction and a y-direction, the substrate having a first region and at least one further second region, and the first region comprises a diffractive structure designed to separate the light beam impinging on the substrate into a zeroth order of diffraction and at least one first order of diffraction; and a detector unit disposed downstream of the substrate in the radiation direction and designed to measure the intensity of the first order of diffraction transmitted through the substrate and to derive a power density distribution therefrom.

15 Claims, 9 Drawing Sheets

(56) References Cited

U.S. PATENT DOCUMENTS

| | | | |
|---|---|---|---|
| 2003/0186142 A1* | 10/2003 | Deshmukh | G02B 6/02085 430/30 |
| 2006/0274418 A1* | 12/2006 | Hirai | B23K 26/0639 359/566 |
| 2007/0172967 A1* | 7/2007 | Katagiri | B82Y 10/00 438/14 |
| 2008/0212185 A1* | 9/2008 | Fuse | B23K 26/0656 359/558 |
| 2010/0134774 A1* | 6/2010 | Lee | G03F 7/70641 355/55 |
| 2014/0168651 A1* | 6/2014 | Guo | G01N 21/554 356/445 |
| 2014/0285877 A1* | 9/2014 | Kirshner | G01J 1/4257 359/350 |

* cited by examiner

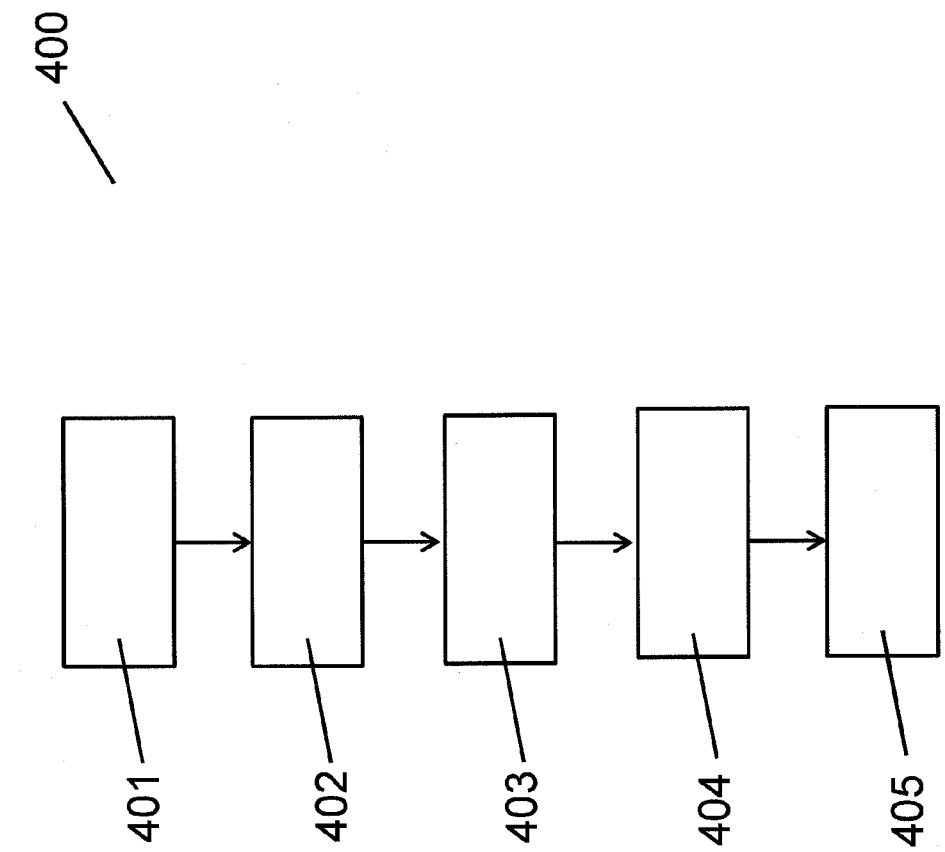

DEVICE FOR MEASURING A POWER DENSITY DISTRIBUTION OF A RADIATION SOURCE

This nonprovisional application claims priority under 35 U.S.C. §119(a) to German Patent Application No. DE 10 2013 014 506.6, which was filed in Germany on Aug. 28, 2013, and to German Patent Application No. DE 10 2014 011 954.8, which was filed in Germany on Aug. 14, 2014, which are both herein incorporated by reference.

BACKGROUND OF THE INVENTION

Field of the Invention

The present invention relates to a device for measuring a power density distribution of a radiation source and to a method for measuring a power density distribution of a radiation source.

Description of the Background Art

Devices for measurement, including for online measurement and control of a laser beam, are known in a variety of embodiments. In this regard, DE 10 2007 062 825 A1 discloses a grating mirror, a monitoring device, a laser resonator and a beam guide which make it possible to couple out and focus a laser beam for online monitoring by means of a single optical element. This solution is has a grating mirror having a local grating period and a local alignment of the grating lines which are chosen in each case such that the grating mirror focuses a laser beam diffracted into a higher order of diffraction onto at least one focal point. In this case, the raw beam is directed via a mirror on which the grating is additionally applied. The complete beam diameter of the laser beam is directed onto the grating. By means of this grating, light is coupled out in only one order of diffraction, said light additionally being focused by the grating at a point, namely at the location of a detector.

The disadvantage of this arrangement is, in particular, that this focusing absolutely necessitates a locally changing grating constant over the area of the grating and the use of the raw beam. This also means that this solution is unsuitable with regard to a lateral intensity profile, that is to say a power density distribution, such as is required for example for industrial lasers for dividing wafers or generally in laser applications with short and high radiation intensities. A reflective element for short wavelengths is disadvantageous here. In DE 10 2007 062 825 A1, what is considered to be problematic about the use of (partly) transmissive materials such as ZnSe, GaAs, Ge, ZnS or Si as substrates for coupling out a portion of the laser beam is that the laser radiation coupled out passes through the substrate material, as a result of which cooling of the optical element can no longer be effected over the whole area from the rear side and therefore has to be effected along the circumference. Moreover, most of the materials mentioned above would have a poor thermal conductivity, which, together with the altered cooling, would result in a greater sensitivity toward destruction in the case of contamination of the optical element used for coupling-out. Furthermore, the focusing or imaging of the laser beam coupled out, if this is required, can generally be achieved only by means of a further optical element. However, this is not permanently critical in the case of the applications already mentioned above, since this is applicable in the IR range, in particular, and, moreover, measurements are not required continuously.

There are also known solutions in which the light distribution is either imaged onto a CCD camera via an optical construction or determined by means of absorbent diaphragms and the resulting intensity downstream of the diaphragm is recorded by means of a totally integrating detector (photodiode, calorimetric detector, etc.). In the case of measuring systems based on the diaphragm(s), in some instances different diaphragms are used, such as e.g. in the case of knife-edge (oblique and straight) and/or slits. From the data thus obtained, the profile is then subsequently calculated (deconvolution). These diaphragms are generally produced from metal or an absorbent metal layer on a transparent carrier substrate. The minimum aperture sizes are in the range of 2 to 5 μm.

This in turn has the disadvantage that, firstly, the CCD-based measuring systems withstand only low intensities. If the intensity becomes greater, then the laser beam has to be attenuated in order not to damage the CCD camera. This attenuation generally takes place by means of neutral density filters. However, distortions in the imaging of the laser beam can occur here on account of surface irregularities or the formation of thermal lenses. The measurement is thus corrupted greatly in some instances.

The diaphragm or knife-edge systems are therefore used at high intensities. However, here there is the disadvantage that, at very high intensities, in particular in the case of pulsed lasers, the absorbent diaphragm material is also eroded and the diaphragm thus degrades rapidly.

SUMMARY OF THE INVENTION

It is therefore an object of the present invention to provide a device for measuring a power density distribution of a radiation source which is improved in comparison with the prior art and which can be used in particular at high power densities, for example in the VUV range.

In an embodiment, a device for measuring a power density distribution of a radiation source is provided, wherein the device can include: a radiation source designed to emit a light beam in a radiation direction; a substrate disposed downstream of the radiation source in the radiation direction and having an extent in an x-direction and a y-direction, wherein the substrate has a first region and at least one further second region, and the first region comprises a diffractive structure designed to separate the light beam impinging on the substrate into a zeroth order of diffraction and at least one first order of diffraction; and a detector unit disposed downstream of the substrate in the radiation direction and designed to measure the intensity of the first order of diffraction transmitted through the substrate and to derive a power density distribution therefrom.

The invention makes use of the insight that the degree of degradation is significantly lower in the case of a diffractive structure since the light beam is not absorbed, but rather only deflected or transmitted. The invention thus uses exclusively the transmitted radiation. Therefore, the device has a significantly longer lifetime and can be used even at intensities at which an absorbent diaphragm in accordance with the prior art would fail. More cost-effective operation of the device is thus made possible by the increased lifetime. According to the invention, the technical feature "diffractive structure" is understood to mean any optical element for shaping a light beam. By way of example, the structure can be a region of a glass carrier on which microstructures are applied by photolithography. Phase modulations occur in said microstructures as a result of different optical path lengths of the partial beams, as a result of which interference patterns arise.

It can also be provided that, instead of the first order of diffraction, a higher order of diffraction is optionally used if an even greater attenuation of the intensity is necessary, since the higher orders of diffraction generally have a lower diffraction efficiency and thus a lower intensity. Consequently, according to the invention, the first order of diffraction should also be understood to mean a higher order of diffraction.

In an embodiment, the entire light beam can impinge on the diffractive structure. Consequently, the entire light beam is diffracted and can be measured by means of the detector unit.

In a further embodiment, the first region can be designed in such a way that only one specific portion of the light beam is separated into a zeroth order of diffraction and at least one first order of diffraction, and the substrate and/or the radiation source are/is designed to be movable and, as a result of a movement of the substrate and/or of the radiation source, a multiplicity of portions of the light beam can be separated into a zeroth order of diffraction and at least one first order of diffraction, which means that the use of a higher order of diffraction is intended not to be excluded here. The diffractive structure can therefore be implemented on a very small, limited area, which need be only a few square micrometers. A specific portion, preferably an individual point, of the light beam can be evaluated by means of this arrangement. A two-dimensional image of the power density distribution can subsequently be recorded by means of movement or scanning of the substrate. Preferably, it is also provided that the substrate has a plurality of first regions each designed to separate at least one specific portion of the light beam into a zeroth order of diffraction and at least one first order of diffraction. The measuring speed overall can thus be increased.

Furthermore, in a further embodiment, the radiation source can be designed as a laser radiation source, in particular having a wavelength of 343 nm. Such a laser radiation source is particularly suitable for material processing for which the device according to the invention can be used.

In a further embodiment, the diffractive structure can be designed as a binary grating, wherein the grating lines of the binary grating are aligned in the x- and/or y-direction. Particularly preferably, one embodiment could be designed in such a way that the diffractive structure of a first region and the diffractive structure of a directly adjacent further first region are aligned in the x- and/or y-direction. Consequently, information about the local polarization could also be obtained in addition to spatially resolved information of the power density distribution.

In accordance with a further embodiment, the binary grating has a grating period, wherein the grating period varies within the grating. Such an embodiment makes it possible to generate different deflection angles of the first order of diffraction. A spatially resolved measurement of the power density distribution is thus possible.

In a further embodiment, the substrate can be inclined by a specific angle and/or a surface normal with respect to the substrate can have an inclination relative to a preferred orientation of the grating. By means of an inclination or an inclination process, more light can be directed into one of the two first orders of diffraction in a targeted manner. This procedure can be used to tune the detector unit.

In a further embodiment, an evaluation and control unit can be furthermore provided, which evaluates the data measured by the detector unit and is designed to forward control signals to the radiation source. The intensity of the radiation source can thus be influenced by feedback control.

Since the signal intensity coupled out, depending on the power of the radiation source used, could still be very high under certain circumstances, it is possible that the detector unit could be damaged during the measurement. The diffractive structure makes it possible, in a very simple manner, to control the intensity of the diffracted light by means of the grating depth and the aspect ratio between trench and web within a grating period.

Furthermore, a method for measuring a power density distribution of a radiation source is provided, wherein the method is implementable according to an embodiment of the device presented above, wherein the method can include the following steps: providing a radiation source designed to emit a light beam in a radiation direction; providing a substrate disposed downstream of the radiation source in the radiation direction and having an extent in an x-direction and a y-direction, wherein the substrate has a first region and at least one further second region, and the first region comprises a diffractive structure designed to separate the light beam impinging on the substrate into a zeroth order of diffraction and at least one first order of diffraction; providing a detector unit disposed downstream of the substrate in the radiation direction; measuring an intensity of the first order of diffraction transmitted through the substrate by means of the detector unit; and deriving a power density distribution from the measured intensity.

Moreover, in a further embodiment of the method, the zeroth order of diffraction can be used for processing a workpiece, and the radiation source can be readjusted if the derived power density distribution does not correspond to a predefined power density distribution. The readjusting step can be effected, for example, by the evaluation and control unit evaluating the data measured by the detector unit and forwarding control signals to the radiation source. The device may therefore also be suitable for monitoring and control during a work process, e.g. cutting process in the case of wafers, in order thus to achieve a very high degree of uniformity on and in the processed workpieces and for the desired shapes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 9 shows a sequence of a method according to the invention.

DETAILED DESCRIPTION

Figure 1:
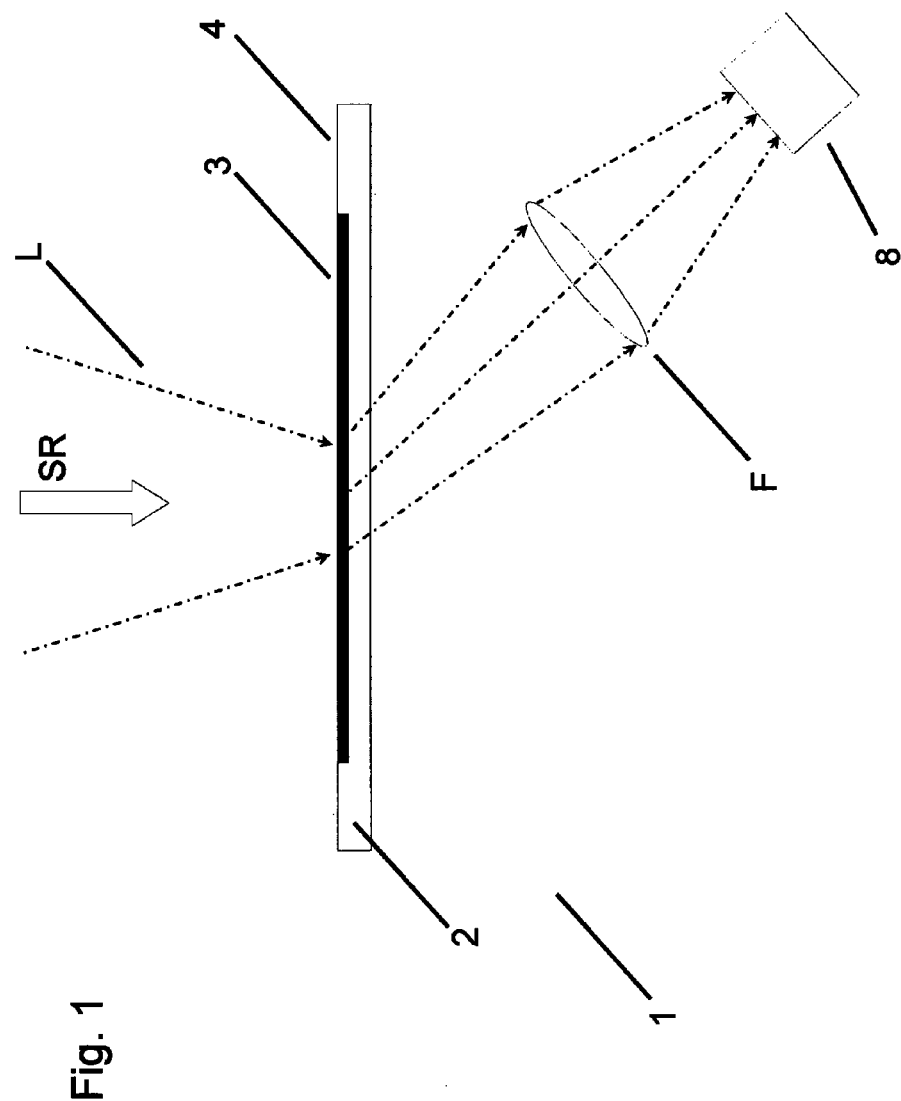
FIG. 1 shows a schematic illustration of a device for measuring a power density distribution in accordance with an exemplary embodiment of the present invention.

FIG. 1 shows a schematic illustration of a device 1 for measuring a power density distribution in accordance with a first exemplary embodiment of the present invention. The device is designed to measure a power density distribution of a radiation source (not illustrated in more specific detail) which emits a light beam L in a radiation direction SR. The radiation source can be, for example, a laser radiation source designed to process a workpiece (not illustrated in more specific detail). This device is provided in order to determine the quality of the radiation, that is to say the power density distribution thereof.

The device 1 comprises a substrate 2 shaped from a transparent material. The substrate has a first region 3 and a second region 4. The first region 3 is designed as a diffractive structure 5. Said structure is suitable for separating the light beam into a zeroth order of diffraction 6 and a first order of diffraction 7 and higher orders of diffraction, only the beam path of a first order of diffraction being illustrated in FIG. 1 for the sake of clarity. The first order of diffraction is focused onto a detector unit 8 by means of a focusing lens F and its intensity is measured and a power density distribution is derived therefrom.

Figure 2:
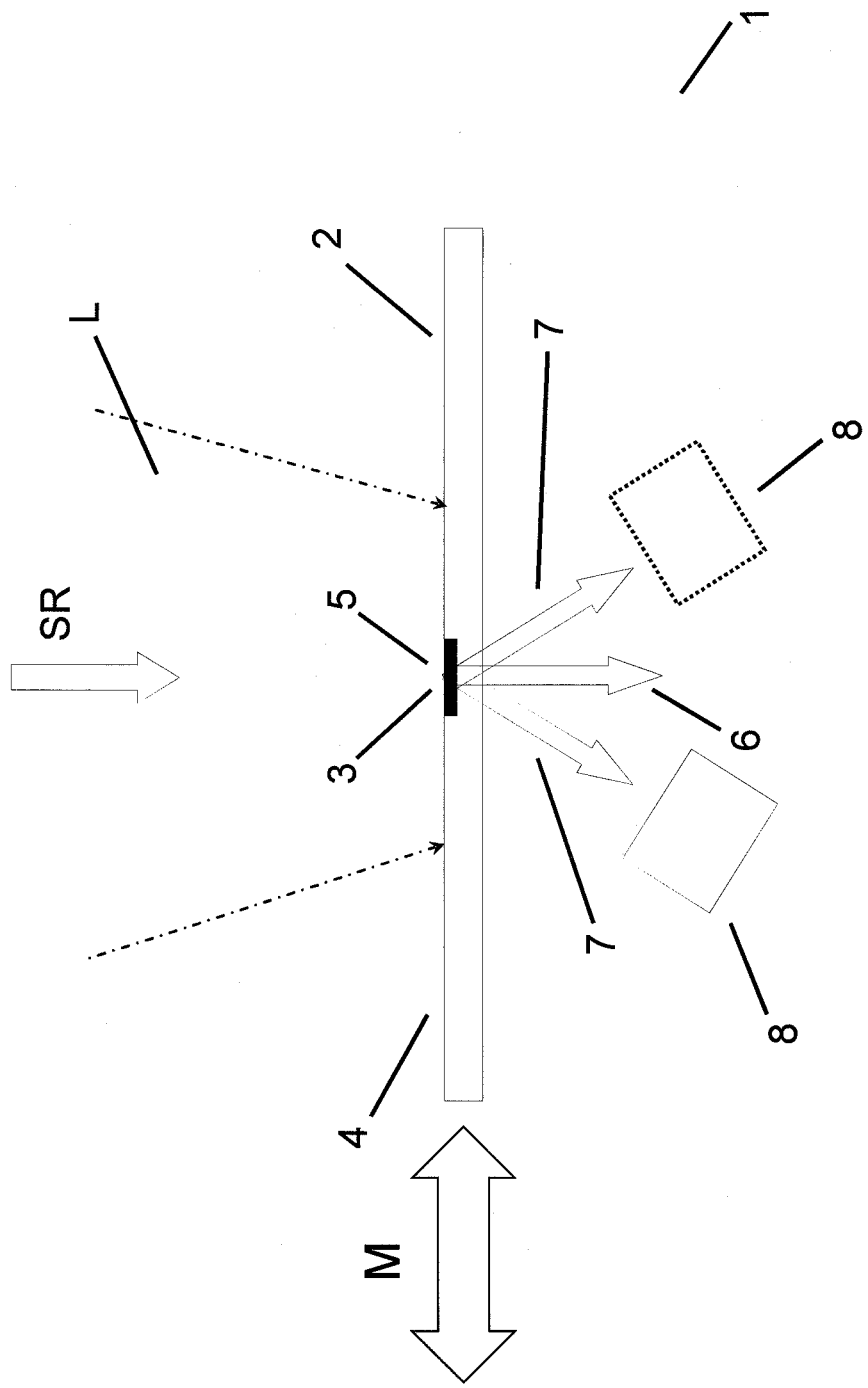
FIG. 2 shows a schematic illustration of a device for measuring a power density distribution in accordance with an exemplary embodiment of the present invention.
Figure 3:
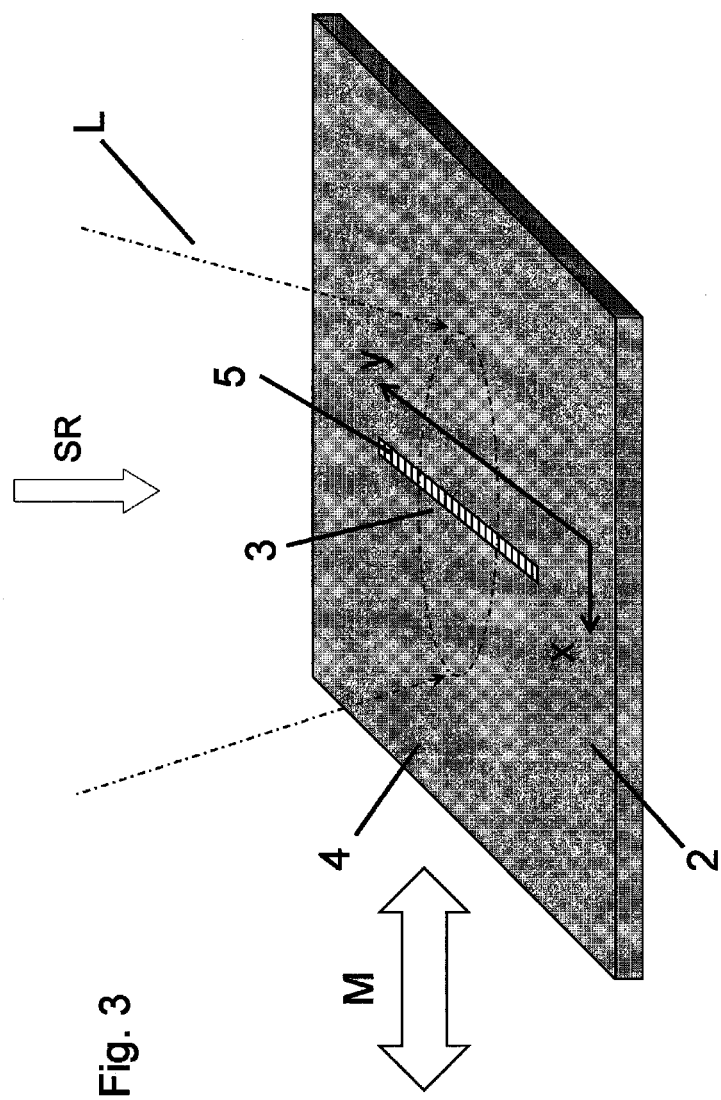
FIG. 3 shows a further schematic illustration of a device for measuring a power density distribution in accordance with an exemplary embodiment of the present invention.

FIG. 2 shows a schematic illustration of a device 1 for measuring a power density distribution in accordance with a second exemplary embodiment of the present invention. The difference between this exemplary embodiment and the exemplary embodiment in accordance with FIG. 1 is that only a certain portion of the light beam is separated into a zeroth order of diffraction 6 and first order of diffraction 7, respectively. In order to measure the entire light beam, in this embodiment provision is made for the substrate 2 to be designed to be movable by a device (not illustrated in more specific detail). A possible movement of the substrate 2 is intended to be made clear illustratively by an arrow M. FIG. 3 shows a further schematic illustration of a device 1 in accordance with FIG. 2. FIG. 3 reveals that the first region is designed to have a smaller area than the second region 4. By way of example, 5 to 15 grating periods of a binary grating can be used for an analyzing area of 2 to 5 μm.

Figure 4:
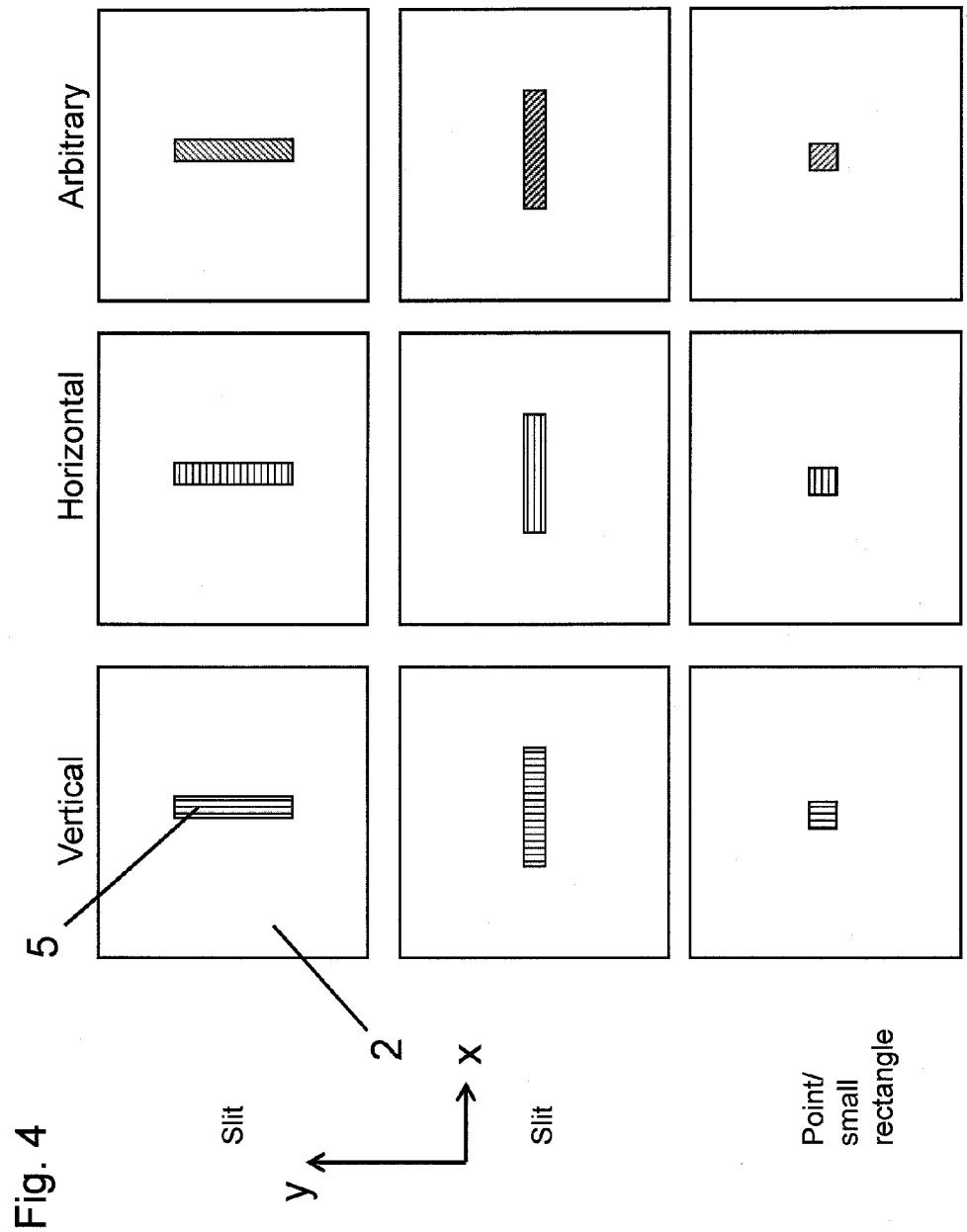
FIG. 4 shows an exemplary embodiment of a first region according to the invention which is designed as a diffractive structure.
Figure 5:
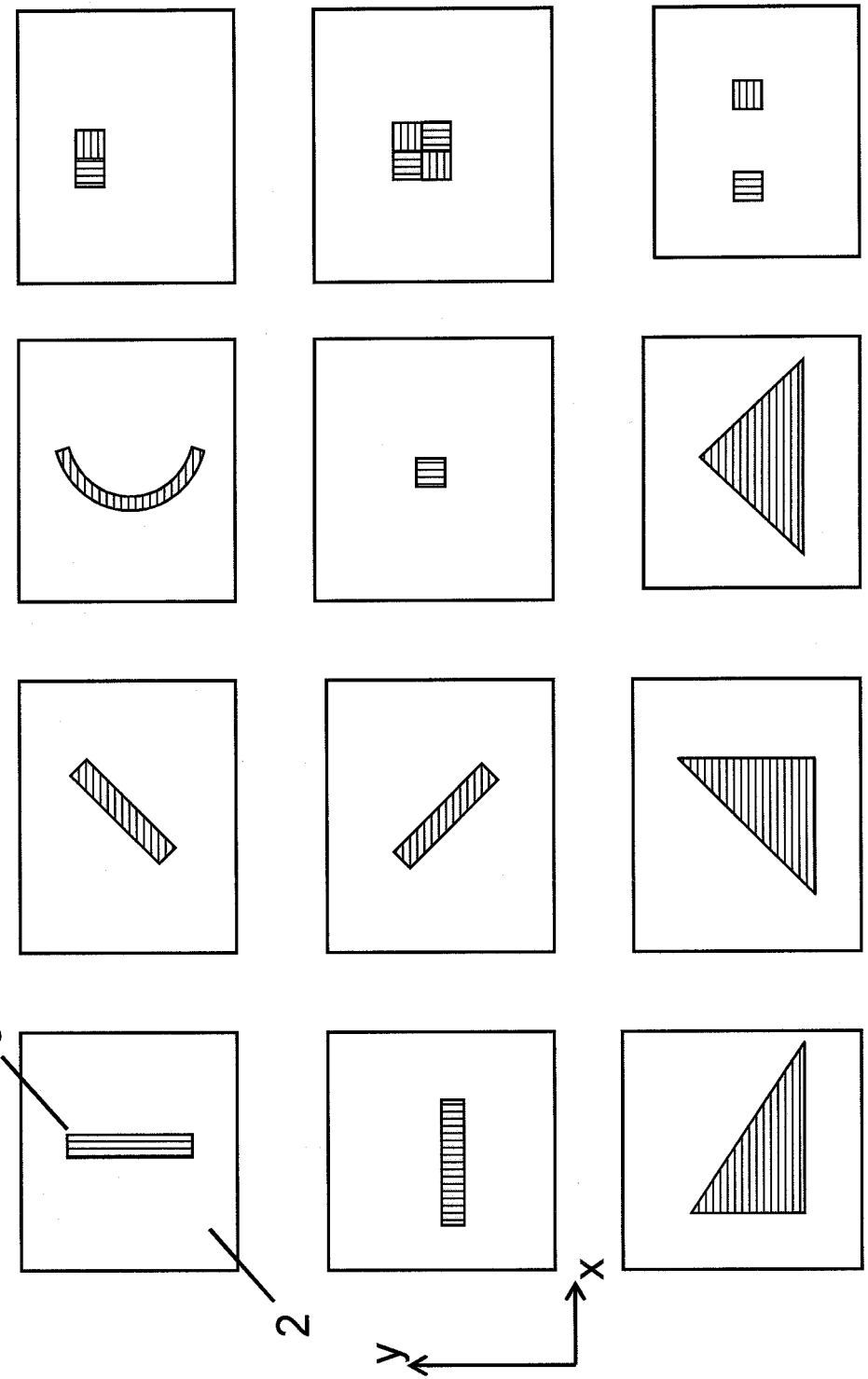
FIG. 5 shows an exemplary embodiment of a first region according to the invention which is designed as a diffractive structure.
Figure 6:
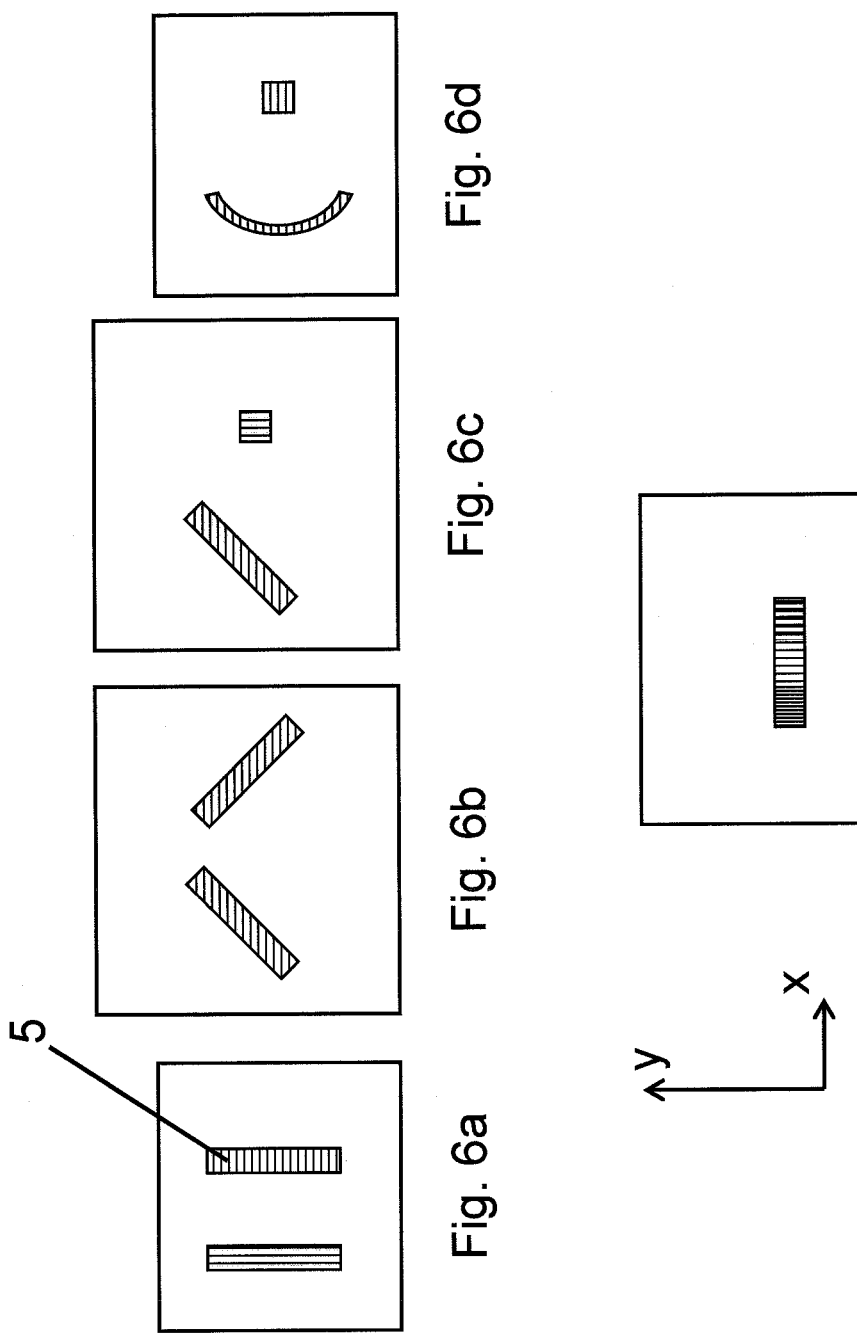
FIGS. 6a-6e show an exemplary embodiment of a first region according to the invention which is designed as a diffractive structure.

FIGS. 4 to 6 illustrate various exemplary embodiments of a diffractive structure 5 according to the invention and the alignment of the grating lines forming the structure. The person skilled in the art can gather from the figures that the grating lines can be oriented along an x- or a y-direction, or in some other direction. It is also possible for a plurality of diffractive structures to be arranged on the substrate, wherein the grating lines of different diffractive structures can have an identical orientation (see e.g. FIG. 6b) or a different orientation (see e.g. FIG. 6a).

Figure 7:
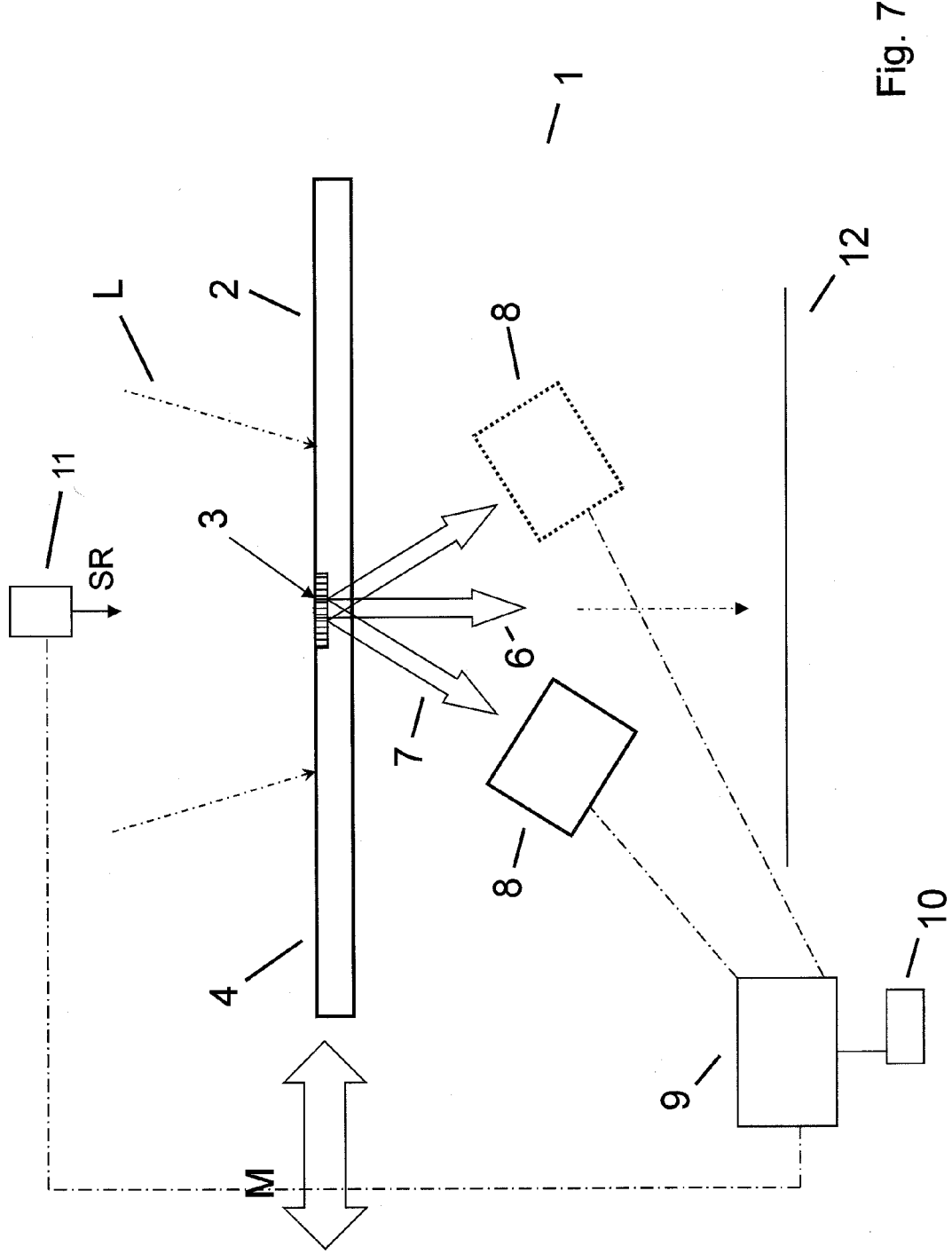
FIG. 7 shows a schematic illustration of a device for measuring a power density distribution in accordance with an exemplary embodiment of the present invention.
Figure 8:
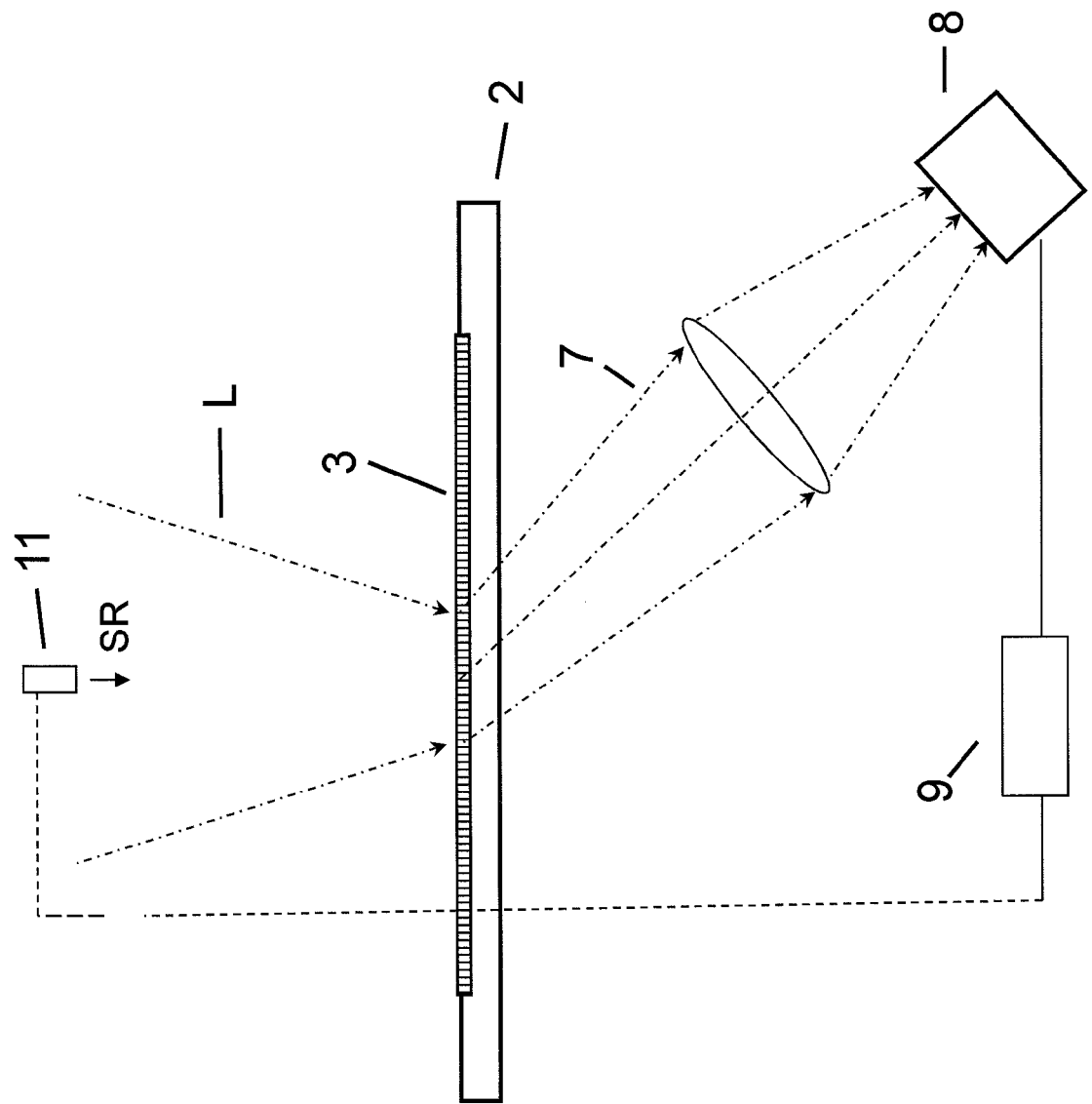
FIG. 8 a schematic illustration of a device for measuring a power density distribution in accordance with an exemplary embodiment of the present invention.

In accordance with the exemplary embodiments illustrated in FIGS. 7 and 8, the device 1 also additionally comprises an evaluation and control unit 9. Said unit 9 serves to evaluate the data measured by the detector unit 8 and to forward corresponding control signals to the radiation source 11. The radiation source 11 could thus be controlled during the processing of a workpiece 12. Optionally, the device 1 in accordance with FIG. 7 could comprise a further optical supervisory unit 10.

FIG. 9 shows a flow chart of a method 400 for measuring a power density distribution of a radiation source in accordance with one exemplary embodiment of the present invention. The method 400 for measuring a power density distribution is advantageously implementable in conjunction with or using the device from FIG. 1, FIG. 2 or FIG. 7 and FIG. 8.

The method 400 comprises a step 401 of providing a radiation source designed to emit a light beam L in a radiation direction SR. Moreover, the method 400 comprises a step 402—following the providing step 401—of providing a substrate 2 disposed downstream of the radiation source in the radiation direction and having an extent in an x-direction and a y-direction, wherein the substrate has a first region 3 and at least one further second region 4, and the first region comprises a diffractive structure 5 designed to separate the light beam impinging on the substrate into a zeroth order of diffraction 6 and at least one first order of diffraction 7. Furthermore, the method 400 comprises a step 403—following the providing step 402—of providing a detector unit 7 disposed downstream of the substrate 2 in the radiation direction. Furthermore, the method 400 comprises a step 404—following the providing step 403—of measuring an intensity of the first order of diffraction transmitted through the substrate by means of the detector unit. Furthermore, the method 400 comprises a step 405—following the measuring step 404—of deriving a power density distribution from the measured intensity.

The exemplary embodiments described and shown in the figures have been chosen merely by way of example. Different exemplary embodiments can be combined with one another completely or with regard to individual features. Moreover, one exemplary embodiment can be supplemented by feature of a further exemplary embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for measuring a power density distribution of a radiation source, the device comprising:
   a radiation source adapted to emit a light beam in a radiation direction;
   a transparent substrate disposed downstream of the radiation source in the radiation direction and having an extent in an x-direction and a y-direction, the substrate having a lesser first region and at least one further second region, the first region comprising a diffractive structure adapted to separate the light beam impinging on the diffractive structure into a zeroth order of diffraction and at least one first order of diffraction; and
   a detector unit disposed downstream of the substrate in the radiation direction and adapted to measure the intensity of the first order of diffraction transmitted through the diffractive structure and to derive a power density distribution therefrom,
wherein the first region is configured such that only one specific portion of the light beam is separated into a zeroth order of diffraction and at least one first order of diffraction, and the substrate or the radiation source is movable and, during a movement of the substrate or of the radiation source, a multiplicity of portions of the light beam are separated into a zeroth order of diffraction and at least one first order of diffraction.

2. The device according to claim 1, wherein the substrate has a plurality of the diffractive structures, each designed to separate at least one specific portion of the light beam into a zeroth order of diffraction and at least one first order of diffraction.

3. The device according to claim 2, wherein the diffractive structures have binary grating lines with an identical orientation.

4. The device according to claim 2, wherein the diffractive structures have binary grating lines with a different orientation.

5. The device according to claim 1, wherein the radiation source is a laser radiation source having a wavelength of 343 nm.

6. The device according to claim 1, wherein the diffractive structure is a binary grating, and wherein the grating lines of the binary grating are aligned in the x- and/or y-direction.

7. The device according to claim 6, wherein the binary grating has a grating period and the grating period varies within the grating.

8. The device according to claim 1, wherein the substrate is adapted to be inclined by a specific angle and/or a surface normal with respect to the substrate and has an inclination relative to a preferred orientation of the grating.

9. The device according to claim 1, further comprising an evaluation and control unit that evaluates the data measured by the detector unit and forwards control signals to the radiation source.

10. The device according to claim 1, wherein the diffractive structure is a slit shape.

11. The device according to claim 1, wherein the diffractive structure is a rectangular shape.

12. The device according to claim 1, further comprising an optical supervisory unit.

13. A method for measuring a power density distribution of a radiation source, the method being implementable in conjunction with a device according to claim 1, the method comprising:
providing a radiation source that emits a light beam in a radiation direction;
providing the transparent substrate disposed downstream of the radiation source in the radiation direction and having an extent in an x-direction and a y-direction, wherein the substrate has a lesser first region and at least one further second region, the first region comprising a diffractive structure separating the light beam impinging on the diffractive structure into a zeroth order of diffraction and at least one first order of diffraction;
providing a detector unit disposed downstream of the diffractive structure in the radiation direction;
measuring an intensity of the first order of diffraction transmitted through the diffractive structure via the detector unit; and
deriving a power density distribution from the measured intensity.

14. The method according to claim 13, wherein the zeroth order of diffraction is used for processing a workpiece, and wherein the radiation source is readjusted if the derived power density distribution does not correspond to a predefined power density distribution.

15. A method for measuring a power density distribution of a radiation source, the method being implementable in conjunction with a device according to claim 1, the method comprising:
providing a radiation source that emits a light beam in a radiation direction;
providing the transparent substrate disposed downstream of the radiation source in the radiation direction and having an extent in an x-direction and a y-direction, wherein the substrate has a lesser first region and at least one further second region, the first region comprising a diffractive structure separating the light beam impinging on the diffractive structure into a zeroth order of diffraction and at least one first order of diffraction wherein the first region is configured such that only one specific portion of the light beam is separated into a zeroth order of diffraction and at least one first order of diffraction;
moving the radiation source or substrate in such a way that a multiplicity of portions of the light beam are separated into a zeroth order of diffraction and at least one first order of diffraction;
providing a detector unit disposed downstream of the diffractive structure in the radiation direction;
measuring an intensity of the first order of diffraction transmitted through the diffractive structure via the detector unit; and
deriving a power density distribution from the measured intensity.

* * * * *